J. L. CREVELING.
ELECTRIC REGULATION.
APPLICATION FILED NOV. 1, 1916. RENEWED OCT. 31, 1921.
1,421,069.
Patented June 27, 1922.
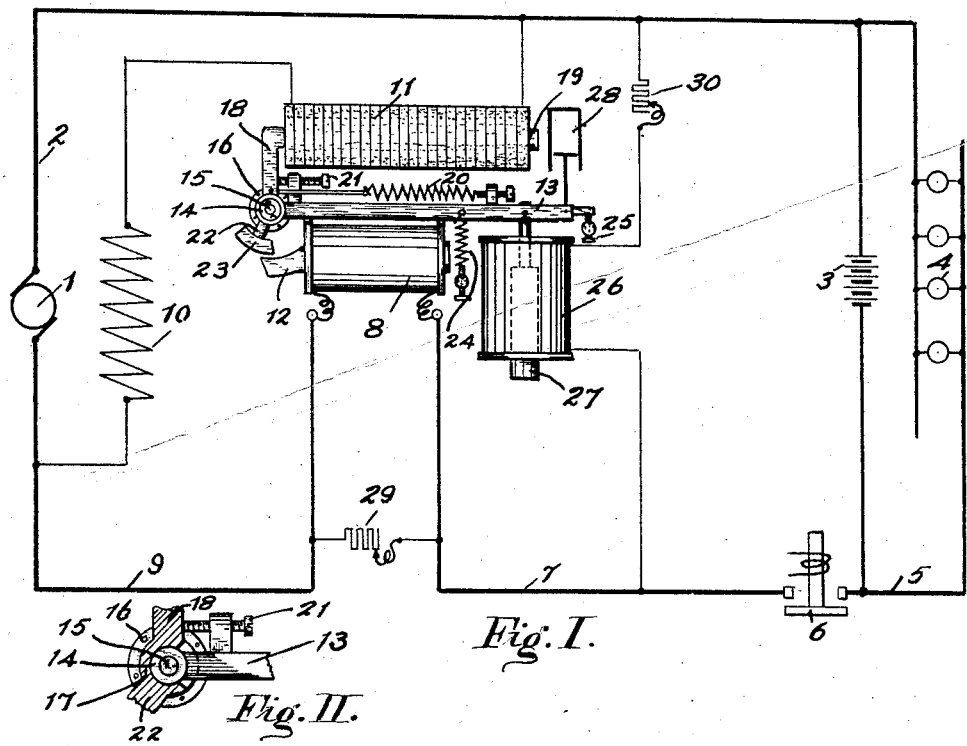
Fig. I.
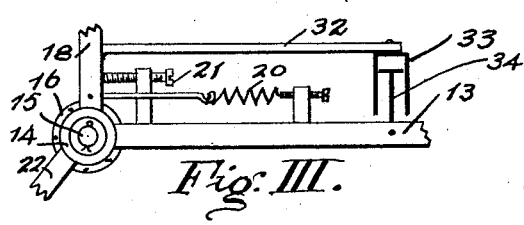
Fig. II.
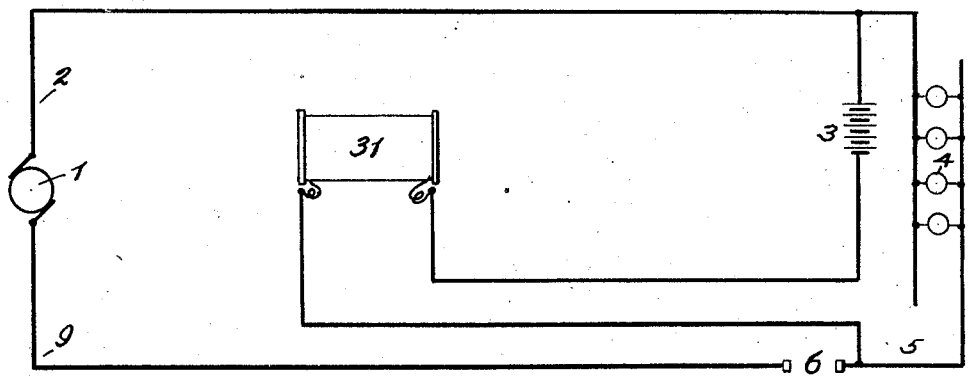
Fig. IV.
Fig. III.
INVENTOR:
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,421,069.  Specification of Letters Patent.  Patented June 27, 1922.

Application filed November 1, 1916, Serial No. 128,823. Renewed October 31, 1921. Serial No. 511,846.

*To all whom it may concern:*

Be it known that I, JOHN L. CREVELING, a citizen of the United States, residing in White Plains, county of Westchester, and State of New York, have invented certain new and useful Improvements in Electric Regulations, of which the following is a description.

My invention pertains to that class of electric regulation wherein it is desired to regulate an electric function or operation in a predetermined manner, and has for a particular object to provide means whereby said regulation will be automatically carried out.

My invention is particularly applicable to systems such as now widely used in the art of railway car-lighting wherein it is desired to so regulate a dynamo or generator that the current in a circuit supplied by the generator and the voltage across a circuit supplied by the generator shall both be prevented from exceeding predetermined limits, and it will be described with particular reference to such a system.

In the drawing, Fig. I represents such a system embodying my invention;

Fig. II is a partial section and elevation of a portion of the apparatus shown in Fig. I;

Fig. III is an elevation of a portion of the apparatus shown in Fig. I with a dashpot added thereto; and Fig. IV is a diagrammatic representation of a modification that may be made in the system of Fig. I without departing from my invention.

In Fig. I, 1 represents a dynamo or generator the positive terminal of which is connected by lead 2 with the positive terminal of the storage battery 3 and lamps or other translating devices indicated at 4. The negative terminals of the translating devices and storage battery are connected as by lead 5 with one terminal of a suitable switch 6, the opposite terminal of which is connected as by wire 7 with one end of the winding or solenoid 8, the opposite end of which is connected as by lead 9 with the negative terminal of the generator, the connection to coil 8 being made by means of flexible connectors to readily permit movement of the coil. The generator is provided with any suitable exciting means, in this instance indicated as the ordinary shunt coil 10, having in series therewith a regulating element 11, indicated as of the carbon pile variety. It will therefore be obvious that the generator may be regulated by proper manipulation of the pressure applied to the pile 11, which will control the resistance thereof. The coil 8 is provided with a core terminating in the pole piece 12 and carried by the movable lever 13, one end of which terminates in the hub or sleeve 14 rotatably supported by the pivot or stud 15 carried by the flange 16. (See also Fig. II.) The sleeve or hub 14 has rotatably mounted thereupon a hub 17 carrying the arm or lever 18 adapted to engage one end of the carbon pile 11 and compress the pile against the stop or abutment 19. 20 is an adjustable spring tending to revolve the lever 18 in a clockwise direction so as to compress the said pile. 21 is an adjustable screw or stop which may limit the motion that spring 20 may impart to lever 18. The hub 17 is also provided with an arm or lever 22 carrying a pole-shoe or armature 23 in operative relation to the core or pole piece 12 so that when the coil 8 is energized, the pole piece 12, by attracting the shoe 23, tends to rotate the hub 17 upon the sleeve 14 and move lever 18 in a counter-clockwise direction and relieve the pressure upon the pile 11. 24 is an adjustable spring tending to draw the lever 13 downwardly and exert pressure upon the carbon pile 11 through the instrumentality of spring 20 and lever 18. 25 is an adjustable screw limiting the downward movement of the lever 13. 26 is a coil or solenoid shown in shunt across the generator main circuit and tending when energized to raise the core 27 which is attached to the lever 13 in such manner as to raise the same. 28 is a dashpot arrangement preventing too sudden movement of the lever 13. 29 is an adjustable shunt whereby the effect of coil 8 may be adjusted. 30 is an adjustable resistance whereby the operation of coil 26 may be adjusted.

In Fig. III the arm 18 is shown as provided with a member 32 carrying a dashpot 33 provided with a suitable plunger 34 carried by lever 13, these instrumentalities cooperating to prevent too sudden movement of the lever 18 with respect to the lever 13.

In Fig. IV like numerals refer to like parts, and the only modification that this figure is intended to bring out is coil 31 which may be used in place of coil 8 of Fig. I, the said coil 31 being in series with the battery circuit instead of the main circuit, as is the said coil 8.

The main switch 6, the mere presence of which is diagrammatically indicated, is preferably one of the automatic variety, closing its circuit when the generator voltage is substantially equal to that of the storage battery and opening the circuit when the generator voltage falls very slightly below that of the battery, so as to prevent back discharge from the battery through the generator. As such switches are well known in the art details are purposely omitted for the sake of brevity.

An operation of my invention is substantially as follows, referring particularly to Fig. I:

If the generator be at rest or running at sufficiently low speed, switch 6 will be open and the transmitting devices 4 may be supplied by the storage battery 3 in a well known manner. If the generator have its speed brought up until its voltage is slightly in excess of that of the storage battery, switch 6 will close and current will flow from the generator through lead 2 to the battery and translating devices 4 and return through lead 5, switch 6, wire 7, coil 8 and lead 9 to the generator. And it will be obvious that the generator may be controlled by proper manipulation of the regulating element 11 in series with the field coil 10. I so adjust the spring 20 and the shunt 29 that, if the generator output reach a predetermined desired limit, appreciable increase above this limit will be prevented by the coil 8 causing the pole piece 12 to attract the shoe 23 and swing the lever 18 against the action of spring 20 so as to relieve the pressure upon the pile 11 and increase its resistance so as to limit the generator output in a well known manner. If desired, a dashpot as shown at 33—34 in Fig. III may be used to prevent too sudden movement of the shoe 23 and lever 18 by coil 8. If for example while operating under these conditions, which will of course hold the generator output from exceeding a predetermined limit throughout wide increases in speed of the generator and also tend to hold this maximum output by tending to decrease the resistance of the pile 11 if the output sink below the maximum, the voltage upon the system should tend to rise above a predetermined desired limit, I so adjust the spring 24 and resistance 30 that coil 26 will then raise the core 27 and lift the lever 13 smoothly against the action of dashpot 28. This will tend to swing the lever 18 away from the pile 11 and increase the resistance thereof, inasmuch as the position of the lever 18 is now determined by the attraction between core 12 and shoe 23, both of which will also be rotated by lifting lever 13. This slight increase in resistance, due to the voltage responsive means usurping the regulation of the generator will ordinarily cause a slight falling off in current in the coil 8, and therefore core 12 will exert less pull upon the shoe 23 and spring 20 will tend to revolve in a clockwise direction so as to increase the pressure upon the pile 11 and re-establish the desired maximum output. And I so adjust the screw 21 that when the lever 13 has been raised slightly to a desired point the said screw 21 will come into contact with the lever 18, and then further upward movement of the lever 23 will control the generator, and any falling off of the pull exerted by the coil 8 will have no effect upon the system, as it will only alter the difference in pressure or stress existing between the screw 21 and the lever 18, as the lever 18 will now be held against the screw 21 by the spring 20, and operated together with lever 13 as a simple bell-crank lever responsive to fluctuations in the coil 26. If while operating in this manner the generator should tend to deliver too great a current, coil 8 will, by attracting the shoe 23, usurp the function of regulation, and the voltage upon the system will fall off slightly and lever 13 will settle down upon the stop 25 and the regulation of the dynamo will be current regulation, as first above outlined, in response to fluctuations in the coil 8.

An operation of that modification intended to be brought out in Fig. IV is the same as that outlined above with regard to Fig. I, with the exception that the current responsive means limits the current in the battery circuit instead of the total output or current in the generator circuit, as described with respect to Fig. I.

From the foregoing it will be noted that I have produced a system wherein the current responsive means and the voltage responsive means both act upon the regulating element through the instrumentality of a single member or lever 18, and that notwithstanding this fact there is no work thrown upon either the voltage responsive means or current responsive means due to falling off of the magneto-motive force in the other responsive means. That is to say, when the current responsive means is alone performing the function of regulation, it operates the lever 18 in the same independent manner that it would if the lever 13 were simply a fixed member capable of performing no regulation whatever, but serving merely as a support for the coil 8 and adjusting screw for spring 20. And when coil 26 raises the lever 13, if the current responsive means is not operating to regulate the generator, screw 21 contacts with lever 18 and swings the same to regulate the pile 11 as an ordinary bell-crank lever. If the current responsive means is operating to regulate the generator and the coil 26 raises the lever 13, the arm 18 swings with the lever 13 as though fixed thereto, owing to the attraction between 12 and 23, until the current falls off in the coil 8, due to the action of the coil 26, which allows levers 18 and 23 to gradually change their angular relation until screw 21 makes contact with lever 18, and then 18 and 13 act as a solid bell-crank lever, unless the current tends to exceed the predetermined value; and fluctuations in current in the coil 8, so long as they are below the maximum current, do not affect the function of coil 26, and the fluctuations in coil 26, so long as below the maximum, do not affect the function of the coil 8 even though united, so to speak, in affecting the regulating element 11 through a single instrumentality, such as the arm 18.

I do not wish in any way to limit myself to the exact constructions nor to the exact mode of operation set forth in this specification for the purpose of merely illustrating one embodiment of my invention, for it is obvious that wide departure may be made therein without departing from the spirit and scope of my invention which is set forth in the following claims:

1. The combination with regulating means and automatic means for affecting the same to cause regulation of a certain electrical function, of means for affecting the regulating means to regulate another electrical function adapted to cause the operation of the regulating means to be transferred from one affecting means to the other by moving the said automatic affecting means.

2. The combination with regulating means and automatic means responsive to a given electrical function for affecting the same, of automatic means responsive to another electrical function for affecting the regulating means by moving the said first named automatic means.

3. The combination with a generator and regulating means therefor, of means for affecting said regulating means in response to current fluctuations, and voltage responsive means for affecting the regulating means independently and by moving the actuating element of the current responsive means.

4. The combination with a generator and means for regulating the same, of automatic means for operating the regulating means in response to current fluctuations, automatic means for affecting the regulating means in response to voltage fluctuations, and means whereby one of said means moves the actuating element of the other responsive means to affect the regulating means.

5. The combination with a generator, of regulating means for affecting the operation thereof, automatically responsive means affected by the operation of the generator and adapted to control the regulating means, responsive means operatively connected with the generator and adapted to operate the regulating means and to affect the regulating means through the instrumentality of the actuating element of first named responsive means.

6. The combination with a generator, of regulating means for affecting the operation thereof, automatically responsive means affected by the operation of the generator and adapted to control the regulating means, responsive means operatively connected with the generator and adapted to affect the regulating means through the instrumentality of the actuating element of the first named responsive means and also independently of fluctuations tending to affect the first-named responsive means.

7. The combination with a generator and means for controlling the same, of current responsive means affecting said controlling means, and voltage responsive means for affecting said controlling means through the instrumentality of a portion of the current responsive means, the co-relation of said responsive means being such that the voltage responsive means may usurp the function of the current responsive means and affect the generator to decrease the operative effort of the current responsive means, and the said decrease in the effort of said means is prevented from causing interference with the operation of the usurping means.

8. The combination with a generator and a storage battery in operative relation thereto, of means for regulating the generator comprehending a regulating element, a member controlling the same, current responsive means affecting said member affected by current to the battery and voltage responsive means affecting said member independently and through the instrumentality of the operating element of the current responsive means.

9. The combination with a generator and a storage battery in operative relation thereto, of means for regulating the generator comprehending a regulating element, a member controlling the same, current responsive means affected by current to the battery affecting said member and voltage responsive means affected by the voltage across the battery affecting said member through the instrumentality of the responsive element of the current responsive means and also independently of current fluctuations therein.

10. The combination with a generator and a storage battery in operative relation thereto, of means for regulating the generator to charge the battery comprehending a regulating element, a member controlling the same, current responsive means affecting said member and voltage responsive means affecting said member through the instrumentality of the current responsive means and independently of current fluctuations therein below a predetermined charging limit and affected thereby when said fluctuations are above a certain limit.

11. The combination with regulating means, of a plurality of actuating elements adapted to respond to a plurality of electrical functions and operate the regulating means, and means whereby one actuating means may usurp the function of regulation from another actuating means by moving said last-named actuating means.

12. The combination with a generator and a regulator therefor, of means for controlling the generator comprehending a coil affected by the operation of the generator for affecting said regulator and a second coil responsive to the operations of the generator for moving the first-named coil to affect said regulator.

13. The combination with a source of electrical energy and means for controlling the same, of a plurality of responsive means affected by said source and each adapted to affect the controlling means, one of said responsive means also affecting the controlling means by moving the other responsive means.

JOHN L. CREVELING.